(12) United States Patent
Toledo Subirana et al.

(10) Patent No.: US 12,442,727 B2
(45) Date of Patent: Oct. 14, 2025

(54) AIR SAMPLING SYSTEM AND METHOD OF USE THEREOF

(71) Applicants: ABC DUST TECHNOLOGIES CORP., Québec (CA); ABCDUST GESTION Y SUPRESION DE POLVO LIMITADA, Santiago (CL)

(72) Inventors: Samuel Toledo Subirana, Quebec (CA); Rafael Toledo Subirana, Santiago (CL)

(73) Assignees: ABC DUST TECHNOLOGIES CORP., Quebec (CA); ABCDUST GESTION Y SUPRESION DE POLVO LIMITADA, Santiago (CL)

( * ) Notice: Subject to any disclaimer, the term of this patent is extended or adjusted under 35 U.S.C. 154(b) by 329 days.

(21) Appl. No.: 17/965,976

(22) Filed: Oct. 14, 2022

(65) Prior Publication Data

US 2023/0117949 A1  Apr. 20, 2023

Related U.S. Application Data

(60) Provisional application No. 63/336,549, filed on Apr. 29, 2022, provisional application No. 63/255,982, filed on Oct. 15, 2021.

(51) Int. Cl.
*G01N 1/22* (2006.01)
*G01N 1/24* (2006.01)

(52) U.S. Cl.
CPC ......... *G01N 1/2273* (2013.01); *G01N 1/2205* (2013.01); *G01N 1/24* (2013.01)

(58) Field of Classification Search
CPC ....... G01N 1/2273; G01N 1/2205; G01N 1/24
See application file for complete search history.

(56) References Cited

U.S. PATENT DOCUMENTS

| | | | |
|---|---|---|---|
| 5,898,114 A * | 4/1999 | Basch | G01N 1/2273 73/863.23 |
| 6,138,521 A | 10/2000 | Basch et al. | |
| 9,528,629 B2 * | 12/2016 | Anderson | G05B 23/0235 |
| 2001/0032518 A1 * | 10/2001 | Boger | F15B 5/006 73/861 |

(Continued)

*Primary Examiner* — Kristina M Deherrera
*Assistant Examiner* — Jean F Morello
(74) *Attorney, Agent, or Firm* — Norton Rose Fulbright Canada LLP; Alexandre Daoust

(57) ABSTRACT

A automated multiple air sampler comprising a pump connected to a manifold, the manifold branching off to a plurality of conduits, each of the conduits connected to a corresponding cassette via a corresponding valve element, each cassette comprising an inlet exposed to the ambient air, an outlet fluidly connected to the conduit, and a filter element between the inlet and the outlet and a controller configured to open and close the valve elements independently from one another. The air sampler permitting sampling ambient air by receiving a indication that the ambient air is to be sampled, the controller operating one of the valve elements, including opening the valve element and closing the valve element, receiving another indication that the ambient air is to be sampled, the controller repeating the step of operating for another one of the valve elements, and tracking the operation of the valve elements.

2 Claims, 10 Drawing Sheets

(56) References Cited

U.S. PATENT DOCUMENTS

| | | | |
|---|---|---|---|
| 2005/0120775 A1* | 6/2005 | Grayfer | G01N 1/2214 73/28.04 |
| 2008/0237516 A1* | 10/2008 | Hansson | F16K 37/0058 251/129.01 |
| 2008/0281528 A1* | 11/2008 | Relle, Jr. | G01N 1/2273 702/50 |
| 2015/0136604 A1* | 5/2015 | Nielsen | B01F 33/30 204/453 |
| 2015/0300928 A1* | 10/2015 | Perez Ballesta | G01N 1/2273 73/863.23 |
| 2016/0223436 A1* | 8/2016 | Caruso | G01N 33/0016 |
| 2021/0267482 A1* | 9/2021 | Purves | A61B 5/087 |

* cited by examiner

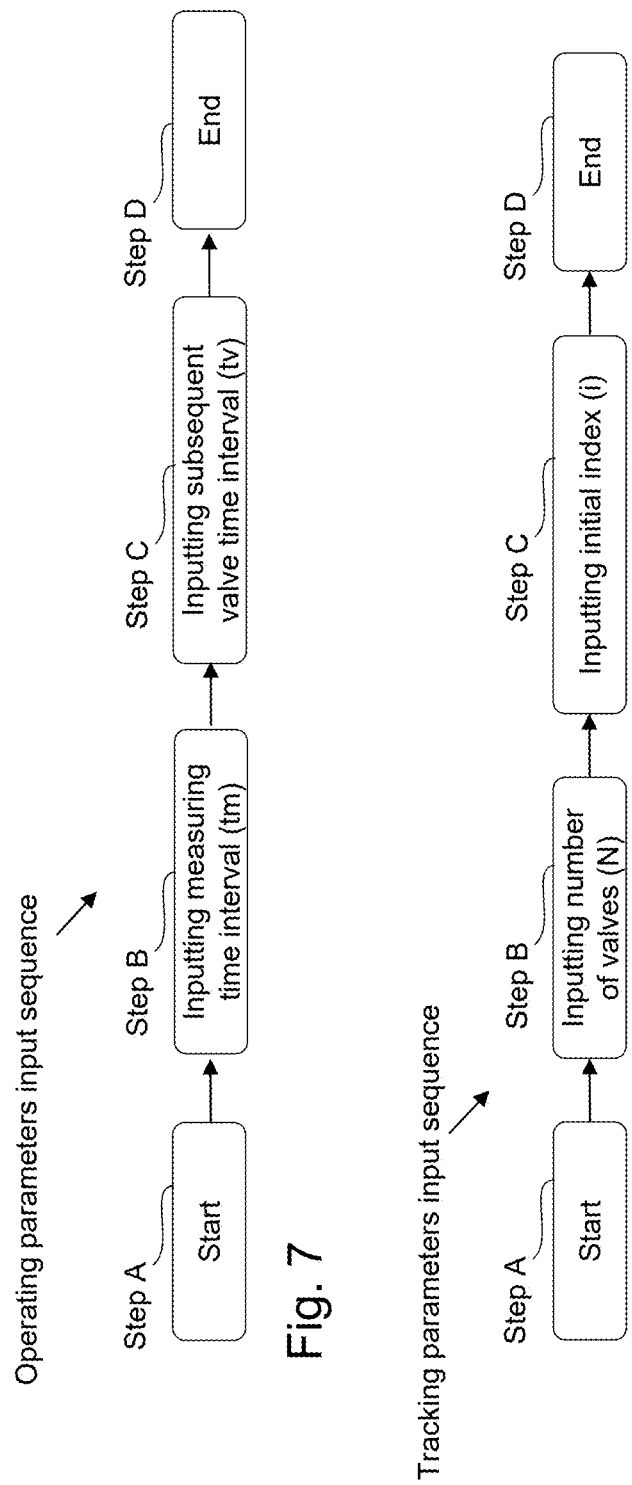

AIR SAMPLING SYSTEM AND METHOD OF USE THEREOF

FIELD

The improvements generally relate to the field of air quality monitoring, and more particularly sampling of air for determining air quality.

BACKGROUND

In the mining industry, a concern is density of particles suspended in the ambient air, and the impact it can have on the workers or equipment exposed to the mining environment. The type and nature of the suspended particles can vary from one context to another and can include mineral dust, silica, viruses, bacteria, aerosols, etc. The density and type of suspended particles can affect ambient air quality and be detrimental to human health and safety, as well as for plants and animals.

Measuring the density of suspended particles and analyzing their content can be a key in managing the impacts but can involve some challenges. While cost reduction for a given level of reliability is always a concern, additional challenges can arise in environments where the density of suspended particles varies significantly over time. As well for places whereas pollutant exposure is extremely high and harmful for workers, minimizing exposure is recommended. There always remains room for improvement.

SUMMARY

As will be appreciated, the mining industry is prone to the generation of important amounts of suspended particles, yet not all work areas are subject to the same amount of particle generation, are equipped with suspended particle mitigation systems or are capable of receiving fresh air in order to dissipate said particles. Indeed, a closed, indoor work area subject to constant loading or unloading of mining materials may have a suspended particle concentration much greater than, for instance, a command centre placed outdoors.

This further has an impact on the personal protective equipment that the workers must use. It is desirable for the required equipment to be adequate for the environment and the amount and type of suspended particles be at all times, while avoiding being of a protection standard above the requirement of the surrounding environment, such as to avoid unnecessary additional costs.

A way of measuring the amount of suspended particles and their components in extremely high concentrations in the ambient air is through gravimetric methods, which consist of initially weighing a certain a filter element, filtering a certain volume of ambient air containing the suspended particles through said filter element and then weighing said filter element at a second point in time in order to ascertain the quantity of particles in the ambient air, and later analyze the filter and material inside captured within the filter element to determine the type of suspended particles found in the ambient air at the time of sampling and their concentration in terms of milligrams per cubic meter.

It was found that providing an automated air sampler permitted to at least overcome some of the limitations of air quality monitoring techniques. Providing such an automated air sampler permitted to quantitatively measure the air quality, or amount of suspended particles found in the ambient air of a certain environment through time. Such an air sampler can be placed in the same environment as other equipment and the operators, such as to ensure that representative, repeatable and comparable samples are being taken, while avoiding human error and the requirement for workers to manually determine the amount of debris at a given time, in a given environment by exposing themselves to potentially dangerous conditions with improper equipment.

In accordance with one aspect, there is provided an air sampler for sampling ambient air, the air sampler comprising a pump having a pump inlet fluidly connected to a manifold branching off to a plurality of conduits, each of the conduits connected to a corresponding cassette via a corresponding valve, each cassette comprising an inlet exposed to the ambient air, an outlet fluidly connected to the conduit, and a filter element between the inlet and the outlet, and a controller configured to open and close the valves independently from one another.

In accordance with another aspect, there is provided an air sampler for sampling ambient air, the air sampler comprising a at least one pump fluidly connected to a manifold, the manifold branching off to a plurality of conduits, each of the conduits connected to a corresponding cassette via a corresponding valve element, each cassette comprising an inlet exposed to the ambient air, an outlet fluidly connected to the conduit, and a filter element between the inlet and the outlet; and a controller configured to open and close the valve elements independently from one another.

In accordance with another aspect, there is provided a method of sampling ambient air in accordance with an air sampling sequence with an automated air sampler having a controller, a plurality of fluid lines, each fluid line connecting a pump to ambient air via a corresponding filter element and a corresponding valve, the method comprising receiving a first indication that the ambient air is to be sampled, the controller operating one of the valves, including opening the valve to establish a flow of ambient air across the corresponding filter element, closing the valve, thereby interrupting the flow of ambient air across the corresponding filter element, receiving a subsequent indication that the ambient air is to be sampled, the controller repeating the step of operating for another one of the valves and corresponding filter element, said repeating contingent upon receiving said subsequent indication, and tracking the operation of the valves, wherein said repeating is further contingent upon said tracking yielding that at least one of said valves has not yet been operated during said air sampling sequence.

In accordance with yet another aspect, there is provided a method of sampling ambient air in accordance with an air sampling sequence with an automated air sampler having a controller, a plurality of fluid lines, each fluid line configured to pump ambient air via a corresponding filter element and a corresponding valve element, the method comprising receiving a first indication that the ambient air is to be sampled; the controller operating one of the valve elements, including opening the valve element to establish a flow of ambient air across the corresponding filter element, closing the valve element, thereby interrupting the flow of ambient air across the corresponding filter element; receiving a subsequent indication that the ambient air is to be sampled, the controller repeating the step of operating for another one of the valve elements and corresponding filter element, said repeating contingent upon receiving said subsequent indication; and tracking the operation of the valve elements, wherein said repeating is further contingent upon said tracking yielding that at least one of said valve elements has not yet been operated during said air sampling sequence.

In accordance with another aspect, the automated air sampler includes a controller connected to a flow, temperature, and moisture sensor and memory to keep a record of how much air was sampled for each cassette with its respective filters, and the temperature and moisture conditions during the sampling period.

Many further features and combinations thereof concerning the present improvements will appear to those skilled in the art following a reading of the instant disclosure.

DESCRIPTION OF THE FIGURES

In the figures,

FIG. 7 is an example schematic diagram of the sequence of steps for setting operating parameters;

FIG. 8 is an example schematic diagram of the sequence of steps for setting the tracking parameters;

DETAILED DESCRIPTION

Figure 1:
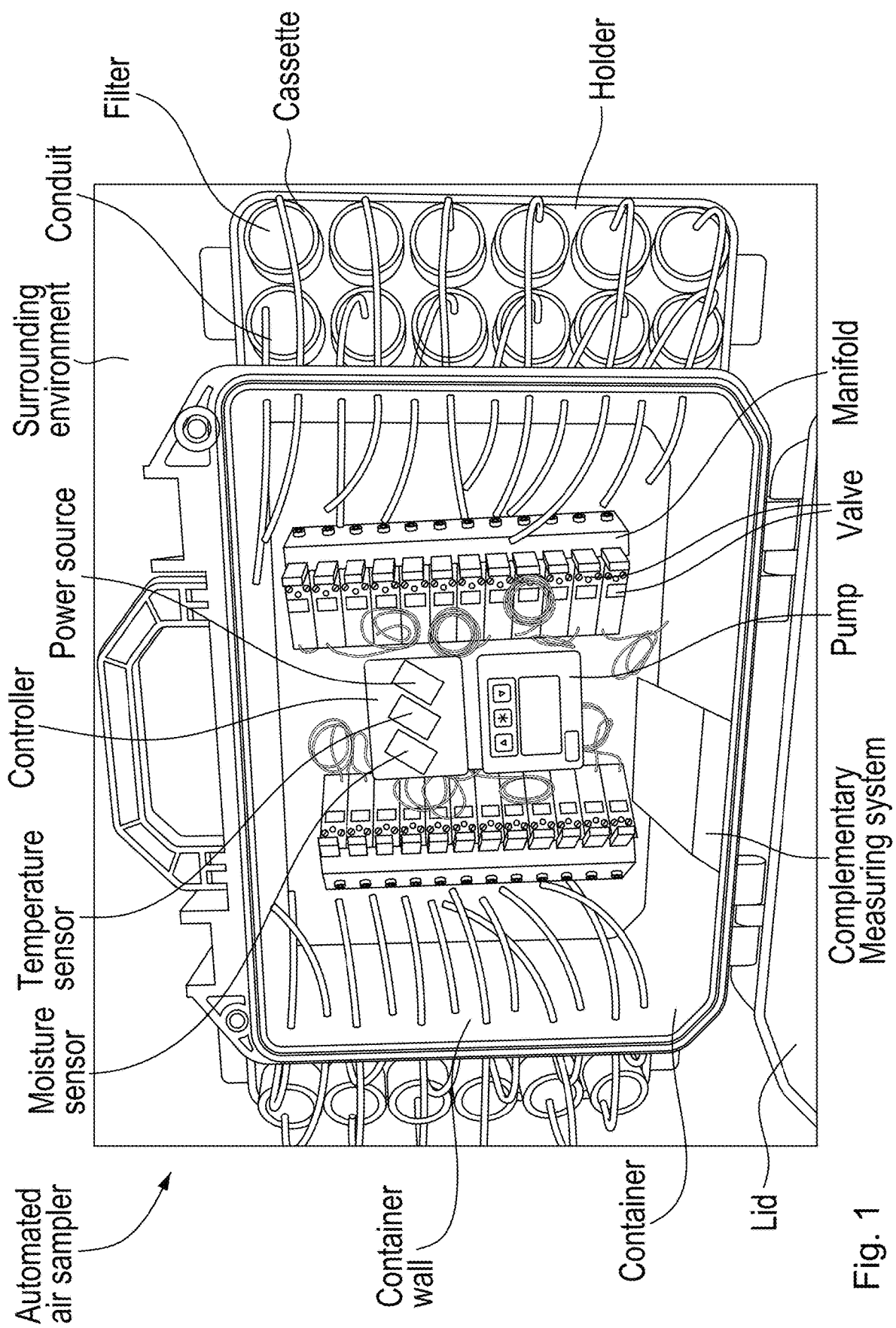
FIG. 1 is a top view of an example of an automated air sampler, with the container having its lid in an open position.

FIG. 1 shows an example of an automated air sampler. The automated air sampler comprises a container in which some of the components are enclosed. The container includes a top, which is hingedly attached to a complementary portion of the container, such that it can swivel in a manner to close the opening of the container and protect the contents therein from the surrounding environment. In this example, the automated air sampler contains a pump fluidly connected to two manifolds, which branch off and connect to a plurality of cassettes, while a valve is placed between the manifold and each one of the cassettes. The cassettes are found on the outside of the container, that is—exposed to the surrounding environment and outside of the volume enclosed by the container of the automated air sampler when the lid is closed. The cassettes are fluidly connected to the pump via the protrusion of a conduit through the container wall. The automated air sampler samples ambient air by the pump drawing the ambient air found in the surrounding environment through the cassette connected to an open valve.

In this particular example, the valves are solenoid valves which are controlled by a controller independently from one another, further details will be provided below. It will, however, be understood that other valve elements can be used without departing from the present application. In certain embodiments, the valve is not at a valve in the traditional sense of an apparatus which has a sole purpose of obstructing of opening a fluidic passage, but is to be understood generally as a structure which can provide such a function. While the term valve is used for the purposes of simplicity, it is understood that the valves described refer to valve elements which can be, for instance, direct acting solenoid valves, indirect acting solenoid valves, or other types of traditional valves, or another apparatus which provides a valve-like function, such as a pump which blocks the fluidic passage based on operation. The examples identifies above are understood to be non-exhaustive and other variations are possible without departing from the present application.

While the embodiment in FIG. 1 shows a single pump for the purposes of drawing air, it is understood that various pumps may be provided without departing from the present disclosure. More specifically, as will be discussed in more detail below, the use of a plurality of pumps may also play the role of the valve elements, which have a open or closed status based on the operation of a given pump in a conduit.

Figure 2B:
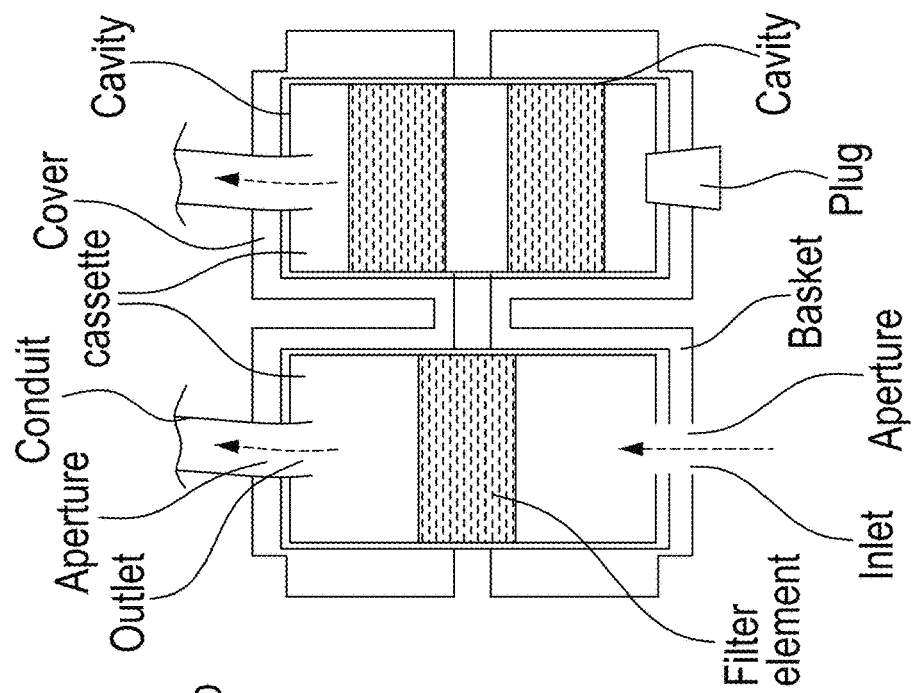
FIG. 2B is a schematic side view of the portion 2B-2B of FIG. 2A, shown enlarged.

As is perhaps best seen in FIG. 2B, the cassettes comprise an inlet, an outlet, and at least 1 filter element between the inlet and the outlet. As will be understood, the filter element is placed in such a way that air drawn through the inlet must pass through the filter element, such that any of the particles suspended in the ambient air may be captured and logged in the filter element, before leaving the cassette via the outlet. While the filter elements shown in the cassettes of FIG. 2B are shown as spanning the width of the cassette, it is understood that alternate filter constructions can be used without departing from the present disclosure. For instance, in an alternate embodiment, the filter element is a support structure which comprises a plurality of filters, which together form the filter element.

In this example, the filter element is a single filter pad made of cellulose having a pore size no larger than 5 µm, capable of capturing particles suspended in the ambient air. It is understood that the filter element may be made of any material, such as nylon, polyester, polypropylene, polyurethane, or any other material capable of capturing the particles suspended in the air which are of interest in a particular application. Similarly, the filter pore size may be of any suitable size for the application at hand. For instance, in an alternate embodiment, the filter element can have a pore size of no more than 2 µm. In yet another embodiment, the filter element can have a range of pore sizes therein, such as between 2 and 5 µm. In yet another embodiment, the filter element can have a pore size of no more than 7 µm. In yet other embodiments, the filter element can have a pore size of no more than 10 µm, no more than 100 µm or no more than 1000 µm. It is understood that in alternate embodiments, the cassette can have more than one filter element placed in series, as is shown in the right-hand side cassette in FIG. 2B. The second filter element can have the same rating as the first filter or be rated differently and/or configured to capture different types of particles suspended in the ambient air without departing from the present disclosure. The term "first filter element" and "second filter element" are being referred to herein in the order the drawn ambient air would interact with the filter element, such that the first filter element is closer to the inlet of the cassette, whereas the second filter element is closer to the outlet of the cassette.

Returning to FIG. 1, in this particular example, the pump is made integral with the controller, and further comprises a temperature sensor and a moisture sensor. A power source is also found within the container and is electrically connected to the pump. When the automated air sampler is operating and sampling the ambient air, air is drawn through a cassette fluidly connected to an open valve. The pump can draw between 1 to 10 L/min and is configured to draw ambient air through the cassette at the desired flow rate for a given amount of time such as to draw the required amount of air through the filter to permit quantitatively measuring the amount of suspended particles having been captured from the ambient air and in correspondence with the rating of the filter element. For instance, in this example, the filter element in the cassettes is a filter pad made of cellulose having a pore size no larger than 5 µm in which 100 L of air is to be drawn through the filter element for measurement. As such, in a first embodiment, the automated air sampler operates at a flow rate of 1 L/min for 100 minutes such as to reach the 100 L sampling volume. In an alternate embodiment, the pump operates at a flow rate of 2 L/min for 50 minutes to reach the 100 L sampling volume. In yet another embodiment, the pump operates at a flow rate of 5 L/min for 20 minutes to reach the 100 L sampling volume.

It is understood that the volume flow rate provided by the pump can be different in alternate embodiments and can be adjusted based on the filter element configuration and the amount of suspended particles that need to be sampled in given conditions without departing from the present disclosure. For instance, in alternate embodiments, the pump can draw up to 50 L/min of air, and can be configured to operate anywhere in its capacity range such as to permit sampling the ambient air in the fashion required for the given air sampling application. In yet another embodiment, the pump can be configured to operate at different flow rates during different sampling events.

As will be further discussed below, the pump in this example is fluidly connected to a moisture sensor and a temperature sensor capable of measuring the moisture content, whether it be in absolute value, relative values or both, and the temperature of the air being drawn through the cassette during the sampling of the ambient air. The moisture and temperature continuously measure the moisture content and the temperature of the ambient air being drawn during sampling. However, it will be understood that in alternate embodiments, the sensors can be configured to punctually measure the moisture content and/or temperature once, or at given intervals during the sampling of the ambient air.

As is perhaps best seen in FIG. 1, the cassettes are placed in the outside of the volume of the container, such as to be exposed to the ambient air. In this particular embodiment, the cassettes are grouped in holders (shown in FIG. 1 without a cover). As is perhaps best seen in FIG. 2A, the holder comprises two halves, a basket and a cover, capable of being removably engaged with one another via clips. The basket having a male portion of the clip at each of its longitudinal ends, while the cover has a complementary female portion of the clip at each of its longitudinal ends. The holder aids in the transportation, placement and tracking of the cassettes which are to be engaged with the automated air sampler via the conduits. As will be understood, the automated air sampler can have a varying number of cassettes for the given application, and having loose cassettes may provide a certain amount of inefficiency during the use of the automated air sampler and/or the transportation of the samples.

As is perhaps best seen in FIG. 2B, the basket comprises a plurality of cavities, each one capable of receiving a portion of a cassette therein. The basket further having an aperture in each one of the cavities, which is configured to be aligned with the inlet of the cassette received within the cavity of the basket. Similarly, the cover comprises a plurality of corresponding cavities capable of receiving the complementary portion of the cassette, that is—the portion of the cassette not received within the corresponding cavity of the basket, within. The cavities of the cover further comprising an aperture configured to be aligned with the outlet of the cassette when the cassette is received within the cavity of the cover.

In this particular example, the holder can be filled with the clean cassettes before being fluidly connecting it to the automated air sampler container. The cassettes are first placed in the basket such that the inlet is aligned with the aperture of the cavity in which it is placed. The cassettes are placed such that the extremity proximal to the inlet abuts with the structure of the basket. Then, the cover is placed such that the plurality of cavities of the cover are aligned with the complimentary portion of the cassettes, which are protruding from the basket, and are slidably received within the aligned cavities of the cover. The cover is slid towards the basket until the male portion of the clip at each one of the longitudinal ends of the holder, found on the basket, are engaged with the female portion of the clip of the holder, found on the cover. The conduits extending from the container of the automated air sampler are then received through the aperture of the cover and are fluidly connected to the outlet of the cassettes.

Figure 2A:
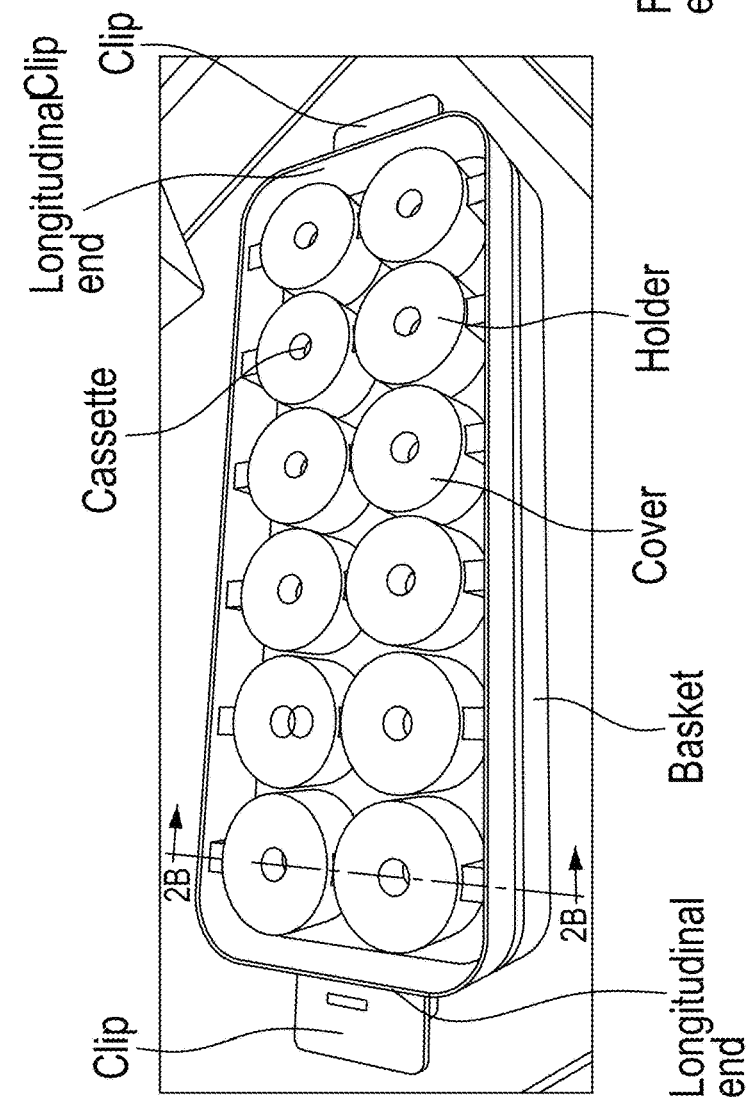
FIG. 2A is an oblique view of an example holder, having the basket and cover engaged to one another.

As will be understood, the structure of the holder can be varied without departing from the present disclosure. For instance, while FIG. 2A shows that the cavities are cylindrical such as to received cylindrical cassettes, the holder can have rectangular cavities and receive rectangular cassettes therein in an alternate embodiment. In yet another embodiment, and as is perhaps best seen in FIG. 1, in other embodiments, the holder can comprise only the basket and can completely omit the cover. Further, the clips can be varied to any other suitable holding means without departing from the present disclosure. For instance, in an alternate embodiment, the clips can be replaced by buckles, spring clips, magnetic engagement means or a hook buckle with engagement means for instance. In yet another embodiment, the clips can be omitted altogether, such that the basket and the cover are held to one another via frictional engagement with the cassettes. The number of cassettes capable of being received in the holder and the arrangement of said cassettes can also be altered without departing from the present disclosure. For instance, while FIG. 2B shows a 2×6 array with a maximal capacity of 12 cassettes per holder, the holder can be altered to have any number of cassettes therein, and any arrangement. For instance, in an alternate embodiment, each holder is capable of receiving 16 cassettes, which are placed in a 4×4 arrangement.

With reference to FIG. 2B, once the automated sampler has been used to sample the ambient air with the cassettes found in the holder, a user may collect the automated air sampler and the holder with the cassettes for analysis. During this process, a plug is used to block the inlet of the cassette, such as to avoid the contamination of the filter element during transport. Said plug can also be used to protect the filter element during the transport to the environment to be sampled, during the installation of the automated air sampler for instance. It is understood that the use of the plug may be omitted without departing from the present disclosure.

Figure 3:
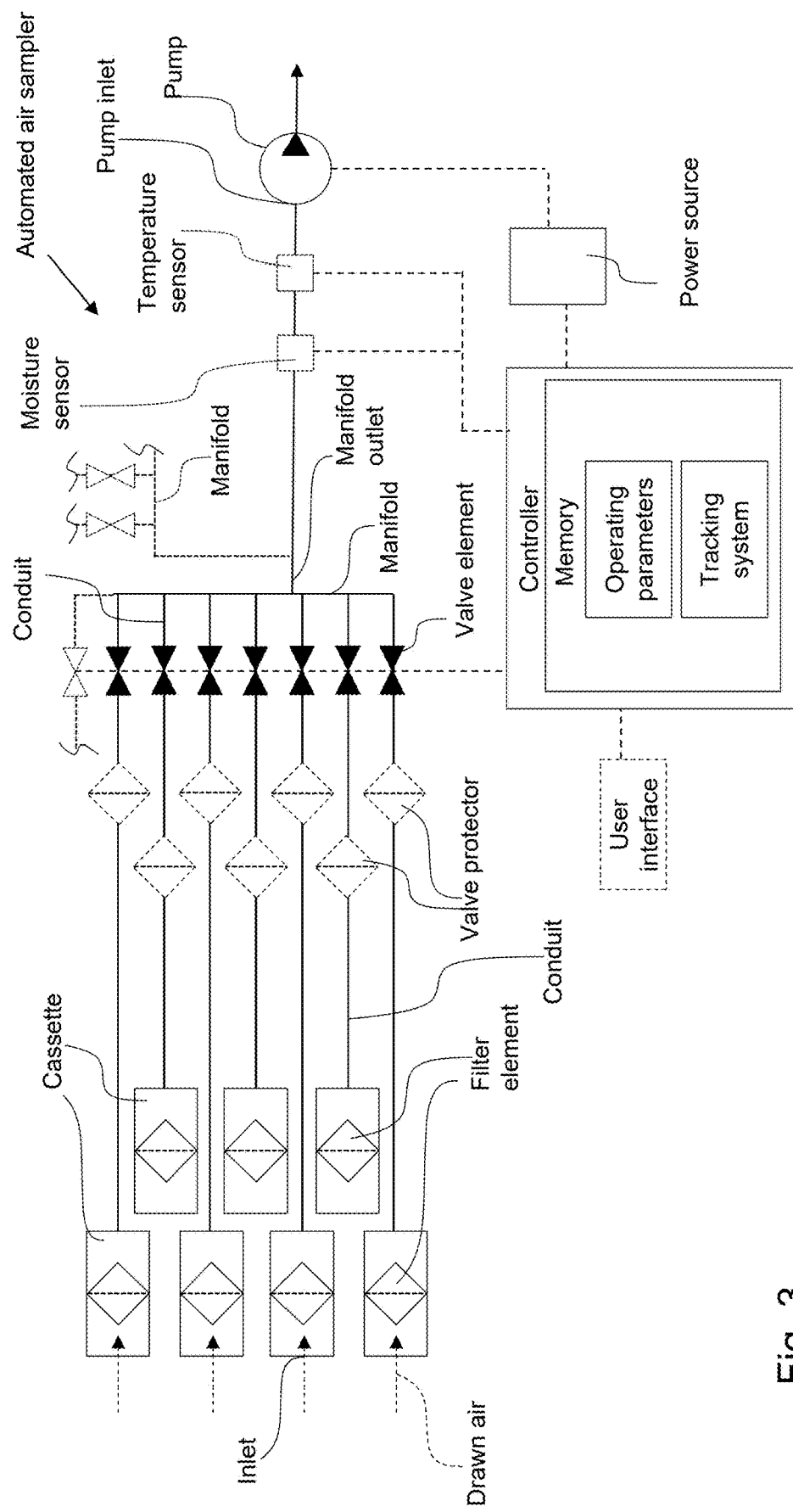
FIG. 3 is a schematic diagram of an example automated air sampler.

Attention is now brought to FIG. 3 showing a schematic diagram of another example automated air sampler. Similar to the automated air sampler seen in FIG. 1, the present embodiment comprises a plurality of cassettes which have a filter element therein. The cassettes being fluidly connected to a manifold via conduits. Each one of the conduits having a solenoid valve as a valve element which can be operated independently from one another to either open or close the flow of air through the conduit. The manifold outlet being fluidly connected to a pump inlet. The valves of the automated air sampler being in a closed position when no sampling is taking place. As will be discussed in further detail below, when a sample is to be taken, one of the valves is to be opened, such as permit it to be drawn through a corresponding cassette, which is fluidly engaged to said open valve while avoiding drawing air in the other cassettes, keeping them clean for future sampling.

The automated air sampler in the present embodiment shows a single manifold with a given number of valves. However it is understood that in alternate embodiments, there can be any number of valves on a given manifold and there can be more than 1 manifold fluidly connected to the same pump or a different, complementary pump without departing from the present disclosure. It is understood that for the automated air sampler to be automated, there must be at least 2 valves related to corresponding cassettes, such as to multiple samples to be collected.

In this embodiment, each conduit of the automated air sampler contains a valve protector upstream of the solenoid valve which is placed such as to catch any particles which have not been caught by the filter element. This may be intentional, for instance in cases where the filter element is chosen to capture a particular type of suspended particles and does not have an affinity for other suspended particles which are not of interest for the sampling, or may be unintentional, for instance if the conduit breaks or is accidentally cut such as to be directly exposed to the surrounding environment. The valve protector may be independent or integral to the solenoid valve. In this particular example, the valve protector is a filter having a 0.45 µm pore size. It is understood that in alternate embodiments, the valve protector can be other types of filters or another type of protector such as a cascade impactor or a single impactor configured to capture particles entrained in the flow that are above a certain size.

While the embodiment shown in FIG. 3 uses solenoid valves as the valve elements, it is understood that other types of valves, or apparatus which may be operated as a valve may be provided without departing from the present application. For instance, as will be discussed in more details below with reference to FIG. 10, in yet another embodiment, the automated air sampler may omit the use of a single pump per manifold and provide individual pumps as valve elements which are open when the pumps are being operated and closed when the pumps are not operating. This configuration leads to correspondingly drawing of ambient air through the cassettes.

Still referring to FIG. 3, the automated air sampler further includes a controller which comprises a memory having operating parameters and tracking parameters, which will be discussed in further detail below. The controller receives power from a power source which also provides power to the pump, and communicates with the solenoid valves to open and close them, and with the moisture and temperature sensors, such as to permit measuring and storing moisture and temperature values. In the present embodiment, the controller further communicates with a user interface, such as to receive start and stop instructions, as well as received information relating the operating parameters and the tracking parameters.

Figure 4:
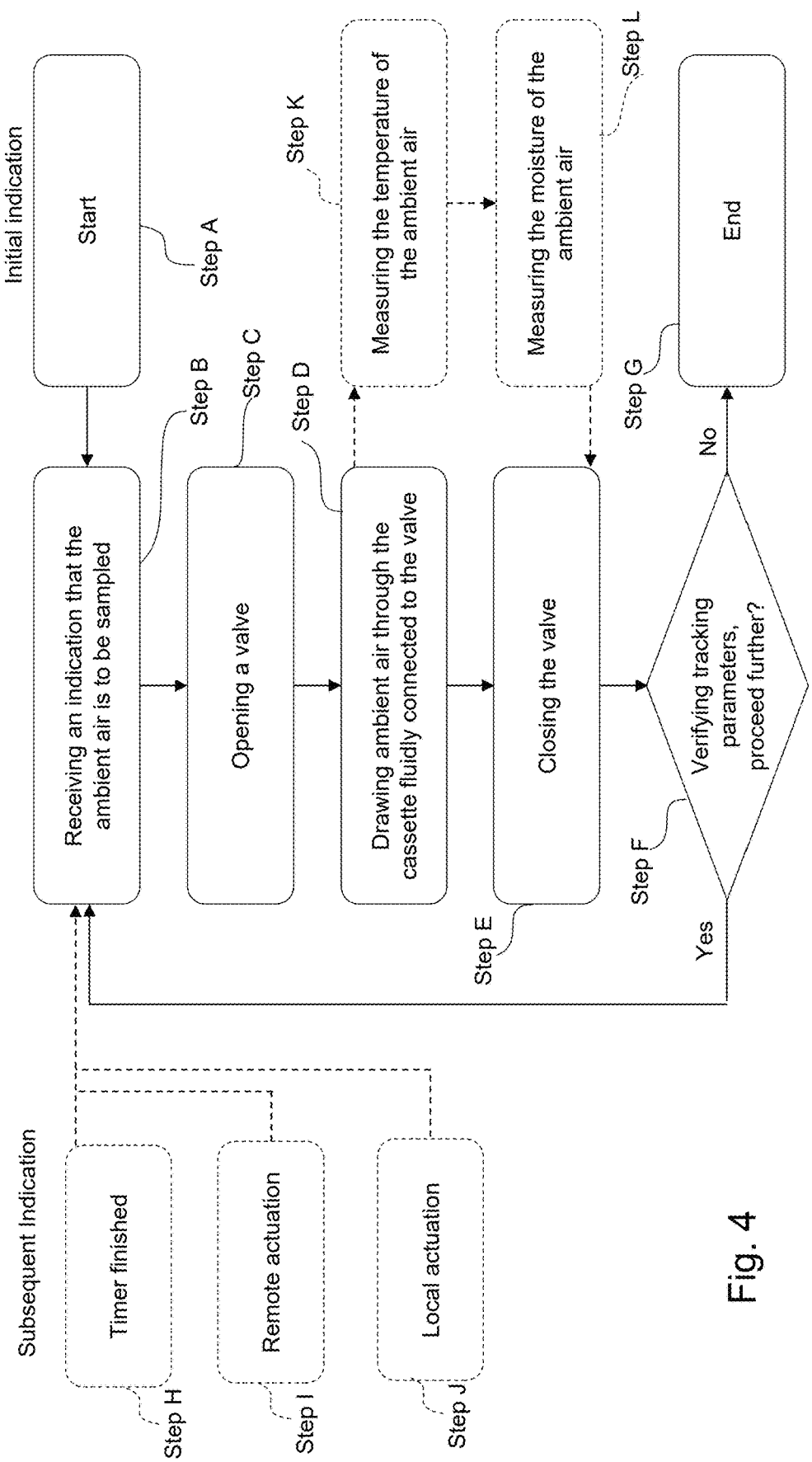
FIG. 4 is a schematic diagram of an example sequence of steps for sampling ambient air.

Attention is brought FIG. 4, a schematic diagram of an example sequence of steps for sampling ambient air with an automated air sampler, such as the automated air sampler of FIG. 3. When the automated air sampler is first placed in the location where the ambient air is to be sampled, a user initially triggers the start of the air sampler, as is shown in step A. It is understood that the start of the automated air sampler may include turning on the pump and closing all the solenoid valves, such as to ensure the automated air sampler is in an initiated position prior to being able to sample the ambient air.

The start of the automated air sampler at step A is then followed by the automated air sampler receiving an indication that the ambient air is to be sampled at step B. When the indication is received at step B, the automated air sampler proceeds in opening a valve at step C. In the embodiment shown in FIG. 3, said valve is opened independently from the other valves. As the pump inlet is fluidly connected to the manifold outlet, ambient air and the suspended particles therein surrounding the automated air sampler, is drawn through filter element of the corresponding cassette fluidly connected to the open valve, as described in step D. When the desired volume of ambient air has been sampled, by drawing said ambient air through the cassette at step D, the automated air sampler proceeds in closing the valve at step E.

The sequence then proceeds in verifying a tracking parameter to determine if another sample of air is to be made at step F. The tracking parameter can vary from one embodiment to another, but generally indicates whether or not another cassette is available to sample the ambient air. If no clean cassettes are available, the sequence proceeds to stop at step G. If step F yields that a clean cassette is available to sample the ambient air, the sequence proceeds to return to step B, wherein a subsequent indication is received indicating that the ambient air is to be sampled. In this particular embodiment, the subsequent indication that the ambient air is to be sampled is the yield of the verification of step F, identifying that an additional cassette is available for sampling ambient air. However it will be understood that in alternate embodiments, various types of indications can be provided such as to complete step B. For instance, in an alternate embodiment, the controller may further comprise a timer which provides the indication when it is finished, such as shown in step H. In another embodiment, the indication is provided by a remote actuation, shown in step I, by another system such as a remote computer found in a command centre for instance. In yet another embodiment, the indication is provided by a local actuation, shown in step J, such as by a worker pressing a button activating the subsequent sampling of the ambient air. It is understood that the above embodiments are examples only and that other sources of indications that the ambient air is to be sampled can be used without departing from the present disclosure.

Still referring to FIG. 4, when the subsequent indication is received at step B, the sequence may proceed in opening a valve corresponding to a clean cassette at step C, that is—a cassette that has not been subject to sampling through the sequence in the past. Ambient air and the suspended particles therein are drawn through the cassette fluidly connected to the open valve until the valve is subsequently closed in step E.

In sequence discussed above, step D further comprises measuring the temperature of the ambient air being drawn through the cassette at step K and measuring the moisture of the ambient air being drawn through the cassette at step L prior to sequence continuing to closing the valve at step E. In this manner, the temperature and moisture content for a given air sample are captured. It is understood that the steps K and L of measuring the temperature and the moisture of the ambient air can be omitted without departing from the present disclosure.

Figure 5:
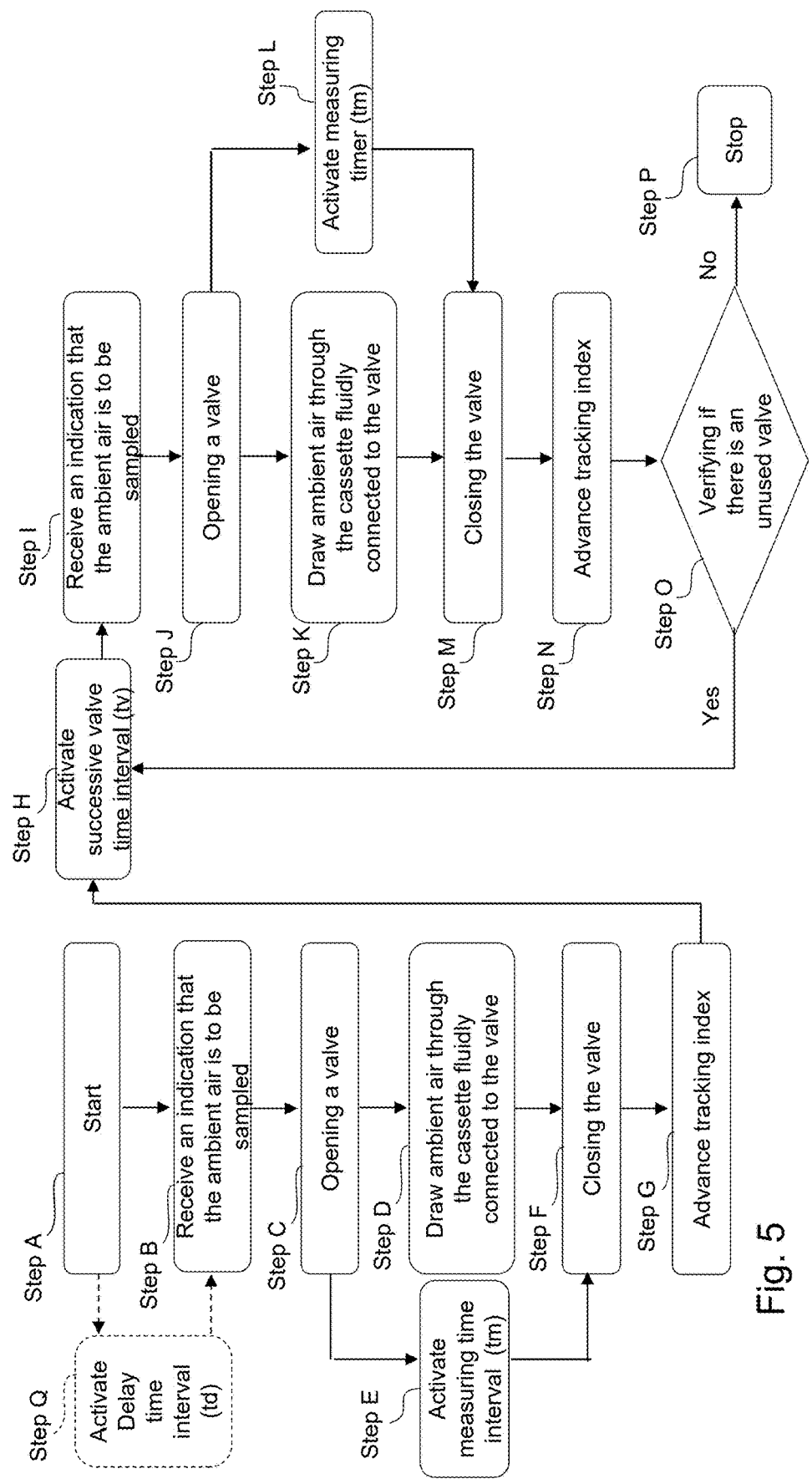
FIG. 5 is another schematic diagram of an example of a sequence of steps for sampling ambient air.

Attention is now brought to FIG. 5 is another schematic diagram of an example of a sequence of steps for sampling ambient air in which the operating parameters are shown. Reference will be made to the example timeline shown in FIG. 6, which generally shows the steps of the sequence found in FIG. 5. As with the general sequence discussed in FIG. 4, the automated air sampler is started at step A. For instance, in this embodiment, the start is the activation of the automated air sampler by a user when placing said automated air sampler in the environment to be monitored. As perhaps best seen in FIG. 6, step A occurs at a time which is identified as $t_0$ in the timeline.

It is understood that the prior the start of the automated air sampler at step A, the automated air sampler may be configured to have the operating parameters and tracking parameters defined. This may be accomplished during the manufacture of the automated air sampler and set within the memory of the controller, or be programmable and modulable by the user based on the particular circumstances of the use of the automated air sampler. In this particular embodiment, the automated air sampler comprises a user interface which permits a user to input the operating parameter and tracking parameter values.

Figure 6:
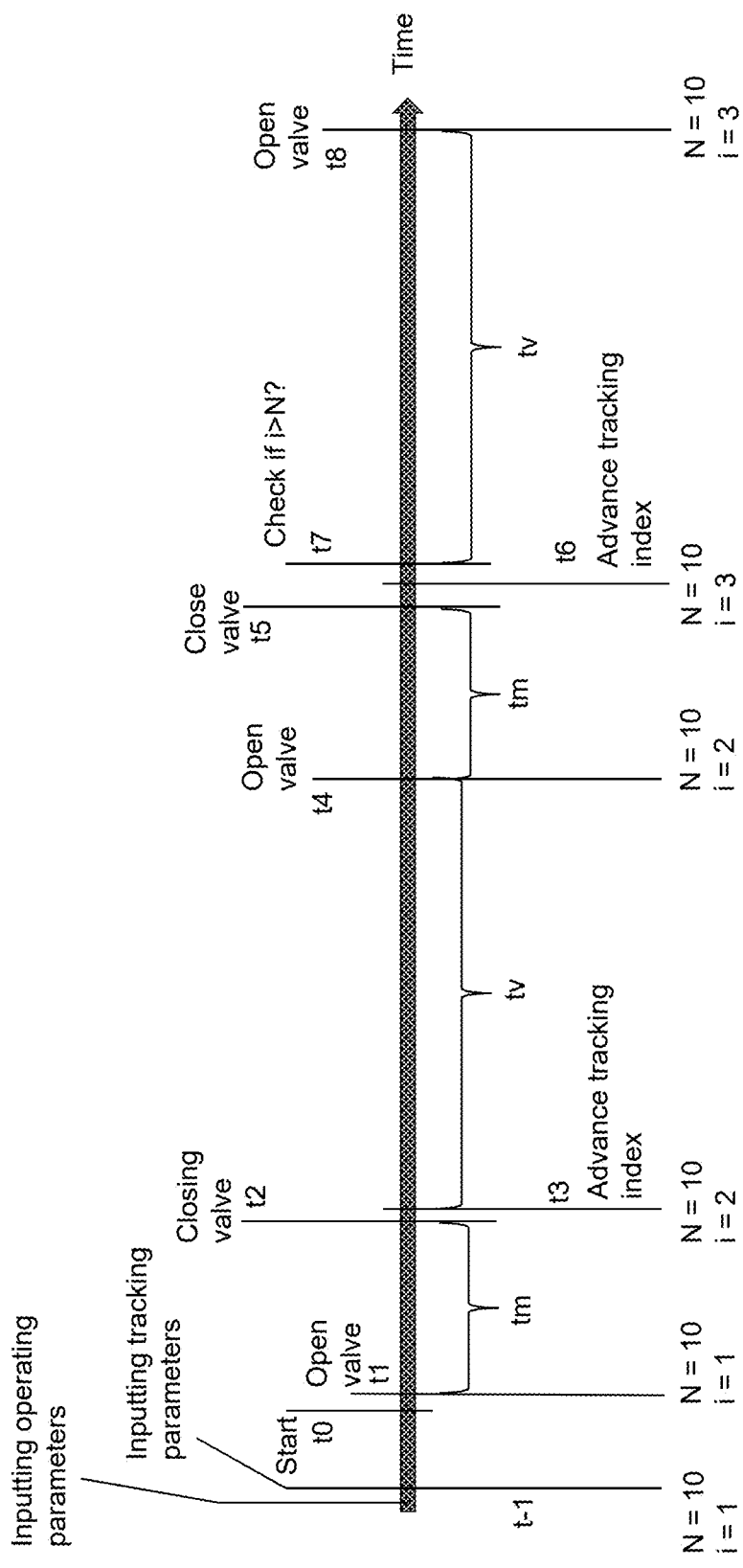
FIG. 6 is an example timeline of the sequence of steps of FIG. 5.
Figure 9:
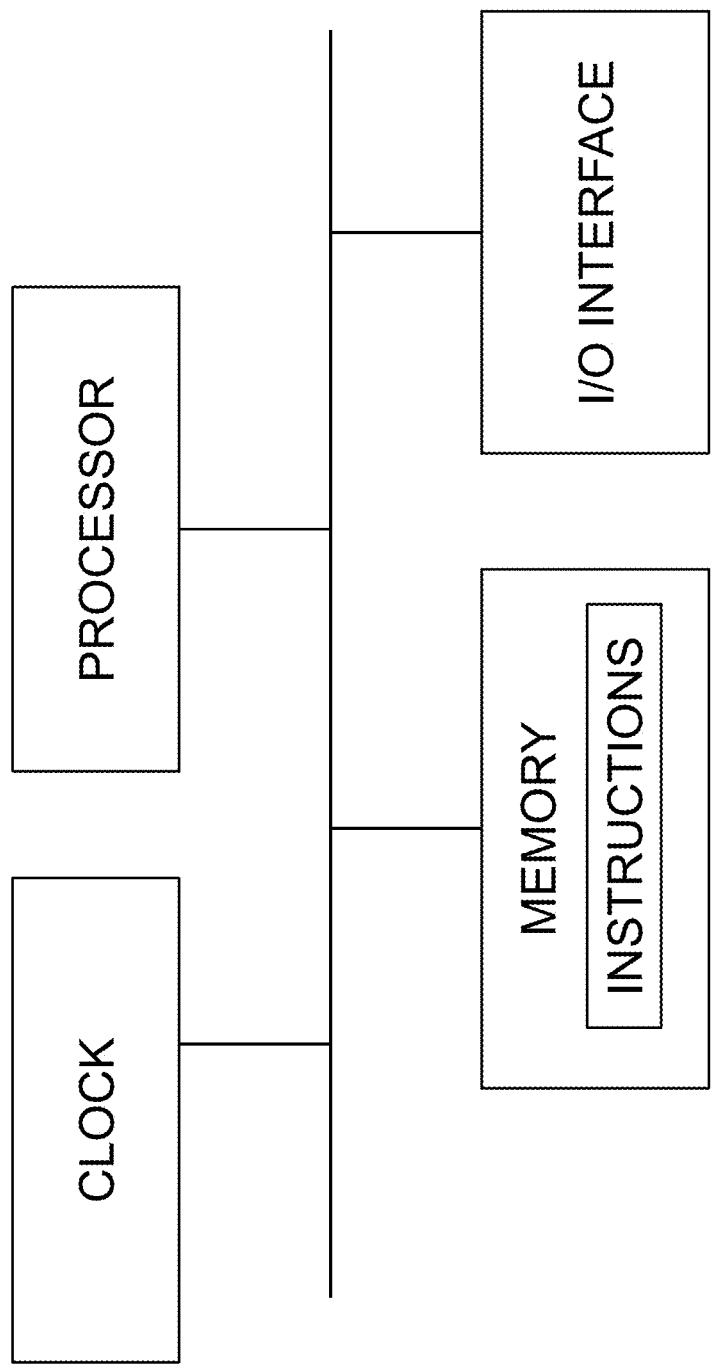
FIG. 9 is an example computer.

In the embodiment shown in FIGS. 5 and 6, the operating parameters refer to the measuring time interval $t_m$ which permits the automated air sampler to consistently open and close the valves for this predetermined period of time and the successive time interval ty which permit which permits the automated air sampler to measure the automated air sampler at the desired times. As is perhaps best seen in FIG. 7, the operating parameters can be provided by an assistance sequence which requests the values for each one of the operating parameters of a given air sampling sequence to be used. In this embodiment, a user may identify that operating parameters are to be set or changed by first starting the operating parameter input sequence at step A. The measuring time interval $t_m$ is then inputted at step B, while the subsequent valve time interval ty is inputted at step C. The inputted operating parameters are then registered in the memory at the end of the operating parameter input sequence shown as step D.

Returning to FIGS. 5 and 6, the tracking parameters refer to the information permitting to determine if there is an unused valve. In this particular embodiment, the tracking parameters comprise a number parameter N indicative of the number of valves in the automated air sampler which are connected to a cassette and an index parameter i which refers to the valve number which is to be used for the sampling of the ambient air. As will be made clear below, this permits the tracking of which valve has yet to be used to sample air and permits the verification step O of FIG. 5 to yield a result. Similar to the operating parameters discussed in FIG. 7, FIG. 8 shows an assistance sequence which requests the values of each one of the tracking parameters for the configuration of the automated air sampler relevant to this embodiment. A user may identify those operating parameters are to be set or changed by first starting the tracking parameter input sequence at step A. The number of valves N is inputted at step B, while the initial index is inputted at step C. The inputted tracking parameters are then registered in the memory of the automated air sampler at the end of the tracking parameter input sequence shown as step D.

With reference to FIG. 6, setting the operating parameters and the tracking parameters takes place at a time $t_{-1}$ which is before the start of the automated air sampler at $t_0$. In the present embodiment, the operating and tracking parameters are inputted via a user interface and saved within the memory of the controller by the user when installing the automated air sampler in the environment to be sampled. However, it is understood that other methods of providing the operating parameters and tracking parameters are possible without departing from the present disclosure. For instance, in an alternate embodiment, the operating parameter and tracking parameters can be set via a remote computer found in a control centre.

In the present embodiment, the inputs for the operating parameters are as follows:

| Operating parameter | Value |
|---|---|
| Measuring time interval $t_m$ | 20 minutes |
| Successive valve time interval $t_v$ | 40 minutes |

While the inputs for the tracking parameters are as follows:

| Tracking parameter | Value |
|---|---|
| Number of valves N | 10 |
| Index i | 1 |

It is understood that the above values for the operating parameters are examples only and can be altered without departing from the present disclosure.

Attention is brought back to FIG. 5. After the start of the automated air sampler in step A at time $t_0$, the sequence proceeds to step B of receiving an indication that the ambient air is to be sampled. In this particular embodiment, the indication is the receipt of the start signal of the automated air sampler. However, as will be further described below, in alternated embodiments, the indication may be provided from another source such as the lapse of a delay time interval $t_d$ shown in step Q. Once the indication is received at step B, the sequence proceeds to opening a valve corresponding to that indicated in the tracking index i at step C, such as to draw ambient air through the cassette fluidly connected to the open valve at step D. The opening of the valve at step C further activates the measuring time interval $t_m$ at step E, such as that the valve opened at step C remains open and permits the drawing of the ambient air at step D until its lapse. At which point, the sequence proceeds to close the open valve at step F. This sequence of events is also seen in the timeline of FIG. 6, which shows the opening of the valve of step C at time $t_1$ and the subsequent closing of the open valve of step F at time $t_2$, wherein the delay between $t_1$ and $t_2$ is the measuring time interval $t_m$.

During steps A-F, the tracking index i remained at a value of 1. Once the closing of the open valve is completed at step F, it can be said that an air sample has been collected. As such, the sequence proceeds to step G of advancing the tracking index by 1, such as to indicate that the next measurement, should there be one, will take place via the valve corresponding advanced index value. This is perhaps best seen in FIG. 6, where the tracking parameters are shown at the bottom of the timeline. As can be seen, at time $t_1$, the tracking index i has a value of 1, which indicates that the valve to be opened at that time is that corresponding to the index i of 1, whereas at time $t_3$, step G of FIG. 5 takes place and changes the tracking index i from its initial value of 1 to a value of 2.

As perhaps best seen in FIG. 5, the sequence then proceeds to step H of activating the successive valve time interval ty. Once the successive valve time interval ty has lapsed the sequence proceeds in receiving an indication that the ambient air is to be sampled at step I. As is understood, in this particular embodiment, the indication that the ambient air is to be sampled at step I is the lapse of the successive valve time interval $t_v$. However, additional indications can be used in coordination with the successive valve time interval ty in the step I without departing from the present application. For instance, in an alternate embodiment, the indication that the ambient air is to be sampled as step I is the triggering of a motion sensor in proximity to the automated air sampler. In this manner, the sampling of the ambient air will only take place when the successive valve time interval $t_v$ has lapsed and that the motion sensor provides the indication at step I.

Following the indication received at step I, the sequence proceeds in opening a valve corresponding to that indicated in the tracking index i at step J such as to permit drawing ambient air through the cassette fluidly connected to the open valve at step K. The opening of the valve at step J further activates the measuring time interval $t_m$ at step L, such as that the valve opened at step J remains open and permits the drawing of the ambient air at step K until its lapse. At which point, the sequence proceeds to close the open valve at step M. This sequence of events is also seen in the timeline of FIG. 6, which shows the subsequent opening of the valve of step J at time $t_4$ and the closing of the open valve of step M at time $t_5$, wherein the delay between $t_4$ and $t_5$ is the measuring time interval $t_m$. As the tracking index i at time $t_4$ has a value of 2, the valve that is opened is that corresponding to this index, and is different from the valve having been previously opened at time $t_1$. Follow step M of closing of the valve at time $t_5$, the sequence proceeds to advance the tracking index i at step N, as described above in relation to step G. As is perhaps best seen in FIG. 6, the tracking index i is advanced by 1 at time $t_6$, providing it with a new tracking index i value of 3.

The sequence then proceeds to a verification step O, such as to determine if there is an unused valve. In the present embodiment, the verification is provided by via the comparison of the tracking parameters, and more specifically by comparing the tracking index i with the number of valves N. As such, if the tracking index i is larger to the number of valves N, the verification at step O yields that no unused valve is available for a subsequence ambient air sample, directing the automated air sampler to stop at step P. However, if the tracking index i is smaller or equal to the number of valves N, the verification step O yields that there is an unused valve which can be used for a subsequent ambient air sample, and redirects the sequence back to activate the successive valve time interval $t_v$ at step H.

This sequence of events is further shown in FIG. 6, wherein the verification step O takes place at time $t_7$. As the tracking index i is smaller than the number of valves N at this point in time, the sequence proceeds in activating the successive valve time interval $t_v$ at step H and can then proceed in repeating steps I to O of which only the action of the subsequent valve opening step J is shown at time $t_8$. It is understood that the sampling is repeated for each one of the valves in accordance with the operating and tracking parameters until ultimately being instructed to stop at step P or being otherwise stopped by an operator.

As is perhaps best seen in FIG. 5, the first air sample is inherently completed by an indication which is different in nature to that of any subsequent air sample. Indeed, the initial air sampler collected through steps B-G take place in response the start of the automated air sampler, which then proceeds in collecting at least one more subsequent air sample through steps I-N. The indications that additional air samples should be collected is provided through the loop of the verification step O, which is distinct from the indication provided in step B.

Still referring to FIG. 5, in some embodiments, it can be desirable for the air samples to be collected to start a certain amount of time after the placement and activation of the automated air sampler. In such an embodiment, the operating parameters further include a delay time interval $t_d$ which is activated concurrently with the start of the automated air sampler at step A. In this fashion, the indication that the ambient air is to be sampled at step B is only received once the delay time interval $t_d$ has lapsed.

With reference to FIG. 6, while it is shown that some of the steps occur at different time points, it is understood that the timeline is an example only and should not be considered limitative in any way. In alternate embodiments, some of the steps shown in the timeline can occur simultaneously without departing from the present disclosure. For instance, the start of the automated air sampler at time $t_0$ and the step of opening the valve at time $t_1$ can occur substantially simultaneously. Similarly, the closing of the valve at times $t_2$ and $t_5$, and the advancement of the tracking index i at times $t_3$ and $t_6$, respectively, can occur substantially simultaneously. It is further understood that the exact moment of the activation of any of the operating parameters can be altered without departing from the present disclosure. For instance, in an alternate embodiment, the activation of the successive valve time interval $t_v$ takes place concurrently with a step of closing of the valve, while the advancement of the tracking index i occurs in parallel with the passage of time within the successive valve time interval $t_v$.

It is understood that the controller described herein can be a computer. The expression "computer" as used herein is not to be interpreted in a limiting manner. It is rather used in a broad sense to generally refer to the combination of some form of one or more processing units and some form of memory system accessible by the processing unit(s). The memory system can be of the non-transitory type. The use of the expression "computer" in its singular form as used herein includes within its scope the combination of a two or more computers working collaboratively to perform a given function. Moreover, the expression "computer" as used herein includes within its scope the use of partial capabilities of a given processing unit.

A processing unit can be embodied in the form of a general-purpose micro-processor or microcontroller, a digital signal processing (DSP) processor, an integrated circuit, a field programmable gate array (FPGA), a reconfigurable processor, a programmable read-only memory (PROM), to name a few examples.

The memory system can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

A computer can have one or more input/output (I/O) interface to allow communication with a human user and/or with another computer via an associated input, output, or input/output device such as a keyboard, a mouse, a touchscreen, an antenna, a port, etc. Each I/O interface can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a computer or a processing unit, the expression "configured to" relates to the presence of hardware or a combination of hardware and software which is operable to perform the associated functions.

It will be understood that the controller, which may or may not be a computer, can include a clock or perform the task of time keeping for the purposes of operating the automated air sampler such as to sample the ambient air at the desirable moments.

As can be understood, the examples described above and illustrated are intended to be exemplary only and are not to be construed as limitative. For instance, and as is perhaps best show in FIG. 1, the automated air sampler can work in coordination or otherwise include a complimentary measuring system. Such a complimentary measuring system can be, for instance, a laser dust monitor or particles counter fit for extremely high concentrations which may punctually or continuously collect data regarding the suspended particles in parallel to the measurements of the automated air sampler. Such a dust monitor can be placed within the container of the automated air sampler while having access to the surrounding environment through a dedicated opening within the container wall (not shown). In certain embodiments connected to the controller.

In yet another embodiment, the pump of the automated air sampler may further be capable of measuring the flow rate as the pump is in use. Said information can be transmitted or otherwise be available to the controller and saved onto the memory. In further alternate embodiments, the flow rate measurement can be of use to verify that the pump is functioning properly. For instance, it may happen that the pump becomes clogged and is unable to operate even if sampling is to be completed and instructions related to said sampling are transmitted by the controller. In such a case, an indication that the pump is clogged may be received by the controller, for instance, which then proceeds in providing an error alarm signal. Such error alarm signal can take various forms such as an audible alarm, a visual indicator identifying an error, or other types methods of attracting attention. For instance, in some embodiments, the controller may include communication means with a control centre, and said error alarm signal can be the transmission of an error message to the control centre, such that action may take place.

Figure 10:
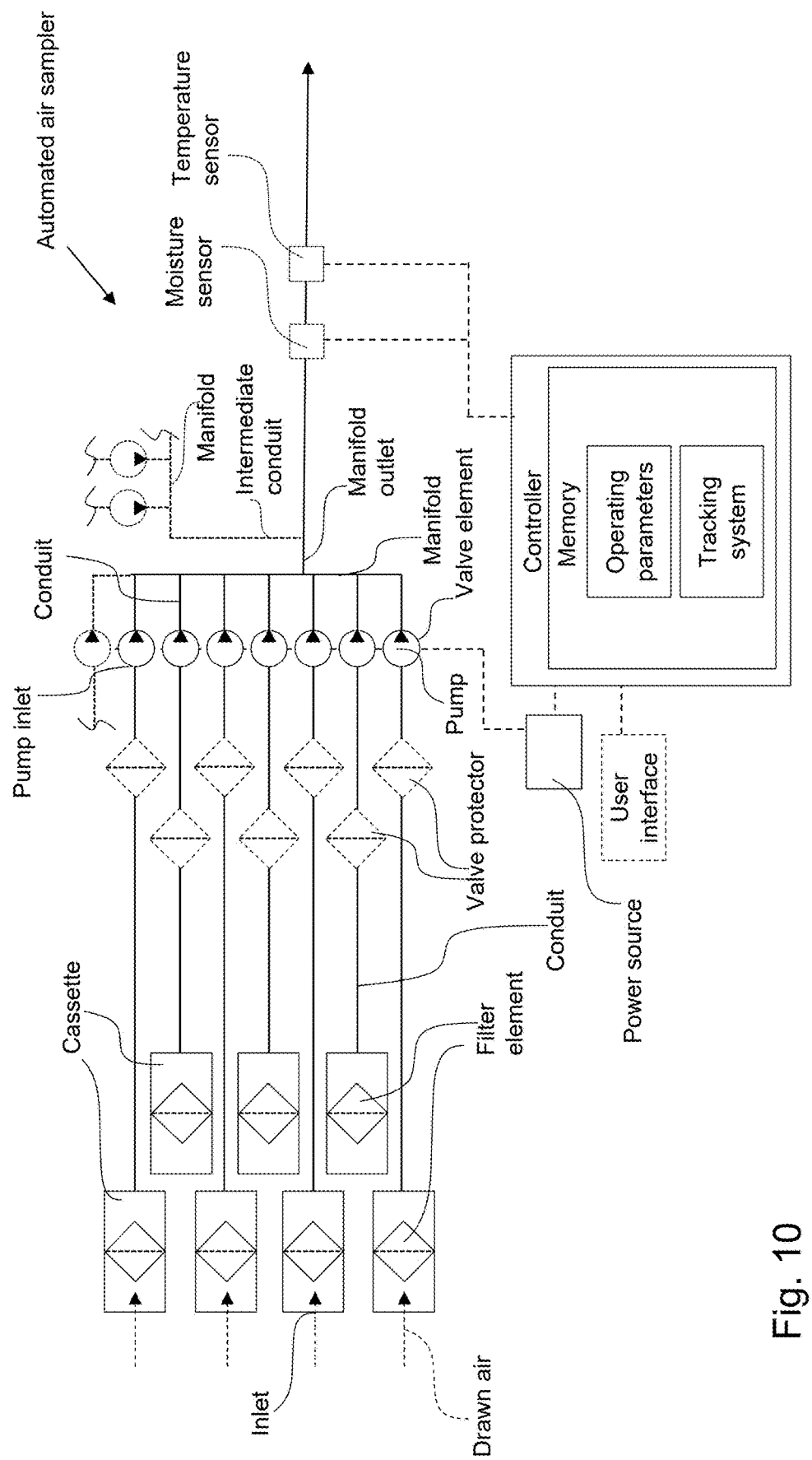
FIG. 10 is a schematic diagram of yet another example automated air sampler.

Attention is now brought to FIG. 10, showing a schematic diagram of another embodiment of the automated air sampler. This embodiment is similar to that having been described above in relation to FIG. 3, for this purposes, only the differences between these embodiments will be discussed in detail here below. The example automated air sampler of FIG. 10 provides a corresponding function of an automated air sampler, permitting ambient air to be drawn at desired times through a cassette for gravimetric measurements and through the moisture and temperature sensor, and subsequently maintaining the fluidic line shut to present additional sampling within a used cassette.

In this embodiment, a pump is provided in each of the fluidic conduits associated to each one of the cassettes in the automated air sampler, upstream of a manifold. Each one of the pumps having a dual role of a valve element capable of opening and shutting the fluidic conduit and a pump capable a displacing fluid through the fluidic conduit. The pumps are by default in their inoperative state, sealing their respective fluidic conduit and providing the same effect as a closed solenoid valve. Each one of the pumps can be operated independently from one another by the controller.

For instance, when a first cassette is to be used for sampling the ambient air, a corresponding one of the pumps, which is fluidly connected to the cassette via a conduit, is operated at the desired flow rate as was previously discussed above. The air is thus drawn through the desired cassette and the filter element therein, capturing the debris. The fluid proceeds through the conduit and, in this particular embodiment, passes through a valve protector which acts as a an additional filter before proceeding to the pump inlet. It is understood that the valve protector may be omitted without departing from the present disclosure.

The pumps are fluidly connected to a manifold, and the pumped air proceeds through a manifold outlet towards the air sampler outlet. The moisture sensor and temperature sensor is provided downstream of the manifold permitting the measurement of the moisture and the temperature of the fluid being pumped during the sampling process prior to its expulsion.

The automated air sampler discussed in FIG. 10 is subject to a similar sequence of steps for sampling ambient air as shown in FIGS. 4 and 5, as well as parameters setting steps shown in FIGS. 7 and 8. For instance, in the sequence of steps in FIG. 4, the steps remain the same, however steps C and E, which are opening the valve and closing the valve, respectively, relate to the actuation of a pump. A halted pump blocks the fluidic passage it is connected to, forming a fluidic blockage, and thus plays the role of a valve element which has been closed in Step E of FIG. 4. Similarly, an actuated pump draws fluid through it and plays the role of a valve element which has been opened. The same applies for steps C, F, J and M of FIG. 5. It understood that in the sequence of steps presented in FIGS. 5, 7 and 8, when discussed in relation to the automated air sampler embodiment shown in FIG. 10, the term "valve" refers to a pump playing the role of a valve element through its actuation.

It is understood that the embodiments of the automated air samplers shown in FIGS. 3 and 10 are not mutually exclusive, and can be combined as necessary without departing from the present disclosure. For instance while FIG. 10 shows that an additional manifold may be provided and connected to the outlet conduit with the moisture and temperature sensors. This manifold can be fluidly connected to any number of additional pumps and cassettes, as for the primary manifold described above in FIG. 10. However, in an alternate embodiment, the second manifold can have only one pump, which is provided downstream of the second manifold, and upstream of the moisture and temperature sensor, within an intermediate conduit. The conduits of that manifold can be provided with valve elements as described in FIG. 3, such as solenoid valves, which can open and close in order to draw air through a given cassette.

Figure 11:
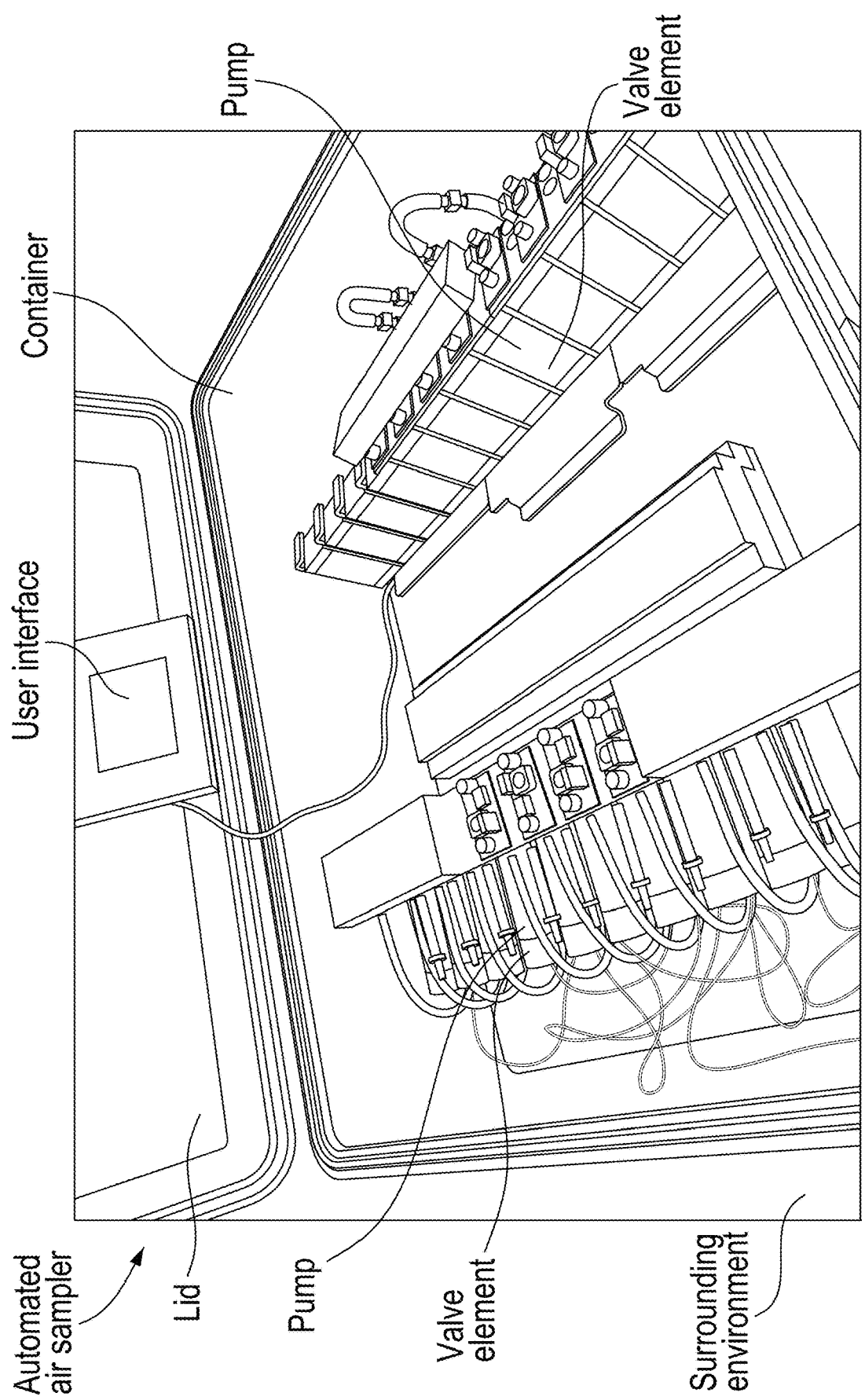
FIG. 11 is a view of an example of a partially constructed automated air sampler, with the container having its lid in an open position.

Attention is now brought to FIG. 11, showing a view of an example of a partially constructed automated air sampler, with the container having its lid in an open position. In this embodiment, the automated air sampler contains various pumps which also act as the valve elements, as was described with reference to FIG. 10. Two series of pumps, placed adjacent to one another, are shown on opposite lateral sides of the container, which can be actuated or halted by the controller independently from one another to draw air through a corresponding cassette at a desired time. It is to be noted that FIG. 11 does not show the conduits extending from the pumps provided as valve elements towards the surrounding environment or the cassettes.

The scope is indicated by the appended claims.

What is claimed is:

1. An air sampler for sampling ambient air, the air sampler comprising:
    at least one pump fluidly connected to a manifold, the manifold branching off to a plurality of conduits, each of the conduits connected to a corresponding cassette via a corresponding valve element, each cassette comprising an inlet exposed to the ambient air, an outlet fluidly connected to the conduit, and a filter element between the inlet and the outlet; and
    a controller configured to open and close the valve elements independently from one another;
    wherein the inlets of the different cassettes form distinct inlets of the air sampler; and
    wherein the controller has a processor and a memory, the memory having instructions stored therein which, when executed by the processor, cause the air sampler to
        receive a first indication that the ambient air is to be sampled;
        operate one of the valve elements, including
            open the valve element to establish a flow of ambient air across the corresponding filter element,
            close the valve element, thereby interrupting the flow of ambient air across the corresponding filter element;
        receive a subsequent indication that the ambient air is to be sampled,
        repeat the step of operating for another one of the valve elements and corresponding filter element, said repeating contingent upon receiving said subsequent indication; and
        track the operation of the valve elements, wherein said repeating is further contingent upon said tracking yielding that at least one of said valve elements has not yet been operated during said air sampling sequence.

2. The air sampler of claim 1 wherein said operate one of the valve elements further includes operate the pump to draw the ambient air found in the surrounding environment in sequence through the corresponding filter element and the valve element, towards the pump.

* * * * *